Oct. 13, 1942.                J. R. MACINTYRE                2,298,893
                              LIQUID LEVEL GAUGE
                           Filed March 21, 1941

Inventor:
John R. Macintyre,
by Harry E. Dunham
His Attorney.

Patented Oct. 13, 1942

2,298,893

UNITED STATES PATENT OFFICE 2,298,893

LIQUID LEVEL GAUGE

John R. Macintyre, South Peabody, Mass., assignor to General Electric Company, a corporation of New York Application March 21, 1941, Serial No. 384,529

7 Claims. (Cl. 73—313)

My invention relates to telemeters and concerns particularly telemeters of the type which may be energized by direct current.

It is an object of my invention to provide a liquid level gauge suitable for tilted tanks, that is, tanks in which the top wall at one end of the tank is nearly as low as the bottom wall at another end of the tank so that a single float gauge anywhere in the tank cannot cover the entire range of possible liquid levels.

Another object of my invention is to provide a telemetering system and transmitter means therefor arranged for transmitting coordinated signals or indications from different points.

Other and further objects and advantages will become apparent as the description proceeds.

Figure 1:
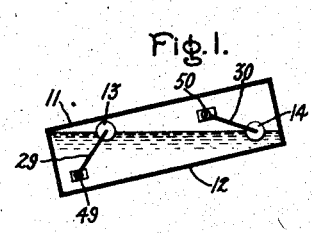
Figure 2:
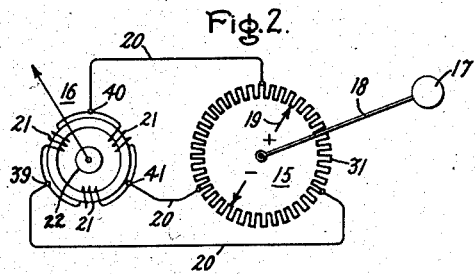
Figure 3:
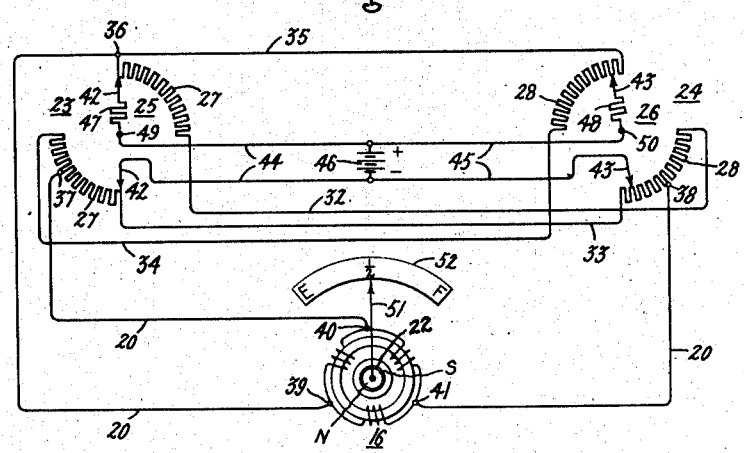
Figure 4:
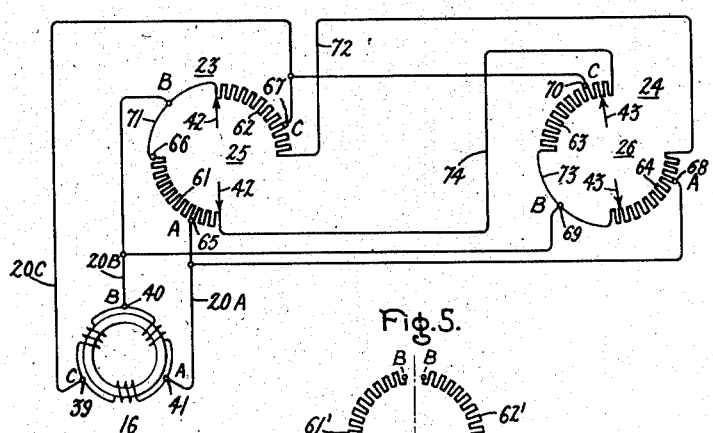
Figure 5:
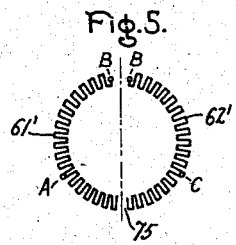

A better understanding of my invention will be afforded by the following detailed description considered in connection with the accompanying drawing, in which Fig. 1 is a vertical sectional view through a tank containing a liquid and showing certain mechanical parts of a liquid level gauge forming an embodiment of my invention; Fig. 2 is a schematic diagram representing the electrical circuits of a direct-current telemeter system for use with a liquid level gauge having a single float; Fig. 3 is a schematic diagram of a telemetering system forming an embodiment of my invention, in which there are two transmitters, or the transmitter is divided into two parts for causing indications to be transmitted from two points such as from the two pivoted floats of Fig. 1; Fig. 4 is a fragmentary diagram of a modification in the arrangement of Fig. 3 for obtaining double the angular deflection; and Fig. 5 is a diagram explanatory of Fig. 4. Like reference characters are used throughout the drawing to designate like parts.

It is sometimes desirable to mount tanks for liquids such as gasoline, for example, in such a manner that the tank is tilted as shown in Fig. 1. In the case of a relatively flat tank or a tank which is tilted at a large angle to horizontal, it is quite possible that a portion 11 of the top wall at one end of the tank may be almost as low, or perhaps even lower, than a portion of the bottom wall 12 at the other end of the tank. In a case of this kind a single-float gauge is not satisfactory for indicating a liquid level throughout the entire indication range from a nearly empty tank to a full tank for the reason that the top and bottom walls limit the possible movement of a movable float of a float gauge. For example, if a float gauge is employed with a single float 13, pivoted at the lower end of the tank, it will reach the upper limit of its motion when the tank is slightly more than half full. Similarly, if a liquid level gauge is employed with a float 14 at the other end of the tank it will reach the lower limit of its motion when the tank is only half empty. In certain machines where space is at a premium, it may be necessary to mount the tanks tilted in the manner shown in Fig. 1 in spite of the disadvantage with regard to the impossibility of employing an ordinary float gauge. This occurs, for example, in the case of airplanes where the gasoline tanks are to be mounted inside the wings and the wings rise at an appreciable angle to the horizontal.

In connection with the indication of tank levels at a distance and the transmission of other indications and measurements to remote points, direct-current telemetering systems have been employed such as those illustrated and described in U. S. Patent No. 2,197,636, Faus. In such systems a transmitter 15 and a receiver 16 are employed as shown in Fig. 2, each consisting of a pair of relatively movable elements. In using such a system in connection with a float gauge having only a single float 17 carried by a pivoted arm 18, the pivoted arm 18 is mechanically connected to a rotatable or movable brush arm 19 carrying a pair of brushes connected to a source of direct current. Angular rotation of the float arm 18, in response to rise and fall of the float 17 with variations in liquid level, causes rotation of the brush arm and, consequently, causes variation in the current distribution and the relative voltages between conductors 20 joining the transmitter and receiver. The variation in current distribution or voltages between the conductors 20 causes a variation in the current distribution or relative voltages of coils 21 of the receiver 16 so as to vary the direction of the resultant magnetic field produced by the coils 21. The angular position of the transversely magnetized permanent magnet receiver rotor 22 thus responds to rotation of the transmitter arm 19, as explained more in detail in the aforesaid Faus patent. If the float 17 is arranged to move up and down in a straight line instead of being pivoted, a straight-line transmitter may be employed as described in Patents No. 2,184,347, Jewell and No. 2,197,636, Faus.

In carrying out my invention in the form illustrated in Fig. 3, I utilize transmitter means somewhat similar in principle to the transmitter 15 shown in Fig. 2 but divided into a plurality of parts. In the specific arrangement illustrated there are two parts 23 and 24 for two pivoted floats at the upper and lower ends of a tilted tank such as that shown in Fig. 1. The transmitter parts 23 and 24 consist of relatively movable elements, viz: brush arms 25 and 26 and potentiometers or resistor pairs 27 and 28, respectively. Where the brush arms are rotatable, the resistors are in the shape of circular arcs or have taps connected to contacts arranged along circular arcs corresponding in diameter to the length of the brush arms to cooperate therewith. One of the relatively movable elements of the transmitter 23, for example, the brush arm 25, is connected mechanically to a pivoted arm 29 carrying the float 13 and one of the relatively movable elements of the other transmitter 24, for example, the brush arm 26, is connected mechanically to a second pivoted arm 30 carrying the second float 14. If the tank shown in Fig. 1 were so long that the range could not be covered by means of two floats, additional floats and transmitter parts would be provided.

From Fig. 1 it will be seen that while the liquid level is rising, the float 13 reaches the upward limit of its motion approximately at a point where the second float 14 begins to rise from its lower limit. Transmitters 23 and 24 are likewise arranged in such a manner that the brush arm 25 sweeps over the resistor pairs 27 and reaches the ends of the resistor pairs approximately at the point where the brush arm 26 reaches the beginning of the resistor pairs 28 before sweeping over them. The resistor pairs 27 and 28 may be considered as separate segments or portions of a complete circular resistor such as the resistor 31 in Fig. 2, with the portion removed from the transmitter 23 being located in the transmitter 24. The fraction of a complete circle occupied by the resistors in each transmitter part is the reciprocal of the number of floats. In the case illustrated with two floats each transmitter has resistance along only one-half a complete circle. In this manner the transmitter 23 operates while the liquid level in the tank of Fig. 1 is below the half-full point and the transmitter 24 operates when the liquid level is above the half-full point. Each transmitter operates between the liquid level for which the corresponding float floats free and is not impeded by an upper or lower tank wall.

The resistor pairs 27 and 28 of the transmitters 23 and 24 are connected in series by means of conductors 32, 33, 34 and 35 in such a manner that a closed electrical circuit is formed from the upper right-hand resistor 27 through the conductor 32, the lower right-hand resistor 28, the conductor 33, the lower left-hand resistor 27, conductor 34, the upper left-hand resistor 28 back to the beginning point of the upper right-hand resistance 27. In the circuit thus traced the path follows through the resistance of the transmitters 23 and 24 alternately, but in the same angular direction, viz: counterclockwise as described. The electrical circuit of the resistors 27 and 28 is therefore equivalent to the complete circular resistor such as the resistor 31 shown in Fig. 2. Three conductors are taken from points 120 angular degrees apart, viz: from the points 36, 37 and 38 to the corresponding terminals 39, 40 and 41 of a "polyphase" telemeter receiver 16. Owing to the similarity of the arrangement of the conductor and coil connections to that of 3-phase alternating-current synchronous motors, and the fact that the receiver produces a rotatable magnetic field, telemeters such as in Fig. 2 are often referred to as direct-current "polyphase" telemeters.

The brush arms 25 and 26 carry pairs of brushes 42 and 43 respectively at their diametrically opposite ends. These pairs of brushes are connected by means of conductors 44 and 45, respectively, to a common source 46 which should be a direct-current source if the receiver 15 is of the type described in the aforesaid Patent No. 2,197,636. Preferably, resistors 47 and 48 are included in the connections 44 and 45 to avoid accidental short circuit of the current source 46 in case one of the brush arms should accidentally be rotated 180 degrees from the position of the other.

The brush arms 25 and 26 are mechanically connected in some suitable manner to pivot shafts 49 and 50 of the float arms 29 and 30. Preferably, the potentiometer resistors and brush arms are outside the tank. The mechanical connection, which does not form a part of my invention may be accomplished by means of a flexible suitable seal, or by means of permanent magnet couplings acting through the non-magnetic copper walls of the tank. A suitable form of such a magnetic coupling is illustrated in Patent No. 2,123,038, Dallman.

It is assumed that with the floats 13 and 14 in the positions where the tank is approximately half full, the mechanical connections will be so made that the brush arms 25 and 26 are approximately in the position shown in Fig. 3. Thus, if the level of the liquid is raised in the tank causing the floats 13 and 14 to rise, the float 13 will first rise just sufficiently to move the brushes 42 off the resistors 27, then it will hit the top wall 11 and come to a stop. However, a further rise of liquid level will cause further counterclockwise rotation of the float arm 30 and the transmitter brush arm 26 causing the brushes 43 to sweep over the resistors 28 varying the voltage distribution along the resistors and causing deflection of the pointer 51 of the receiver 16 toward the full-scale mark, F. Likewise if the liquid level falls from that shown in Fig. 1, the float 14 will come to a lower stop by reason of striking the lower wall 12 shortly after moving the brushes 43 off the ends of the resistors 28 of the right-hand transmitter part 24. However, the complete downward sweep of the float 13 as the tank empties will result in the brushes 42 sliding along the resistors 27 of the transmitter part 23 causing the requisite variation in voltage distribution to cause the receiver pointer 51 to deflect toward the empty mark, E. Inasmuch as the electrical connections between the transmitter and the receiver are symmetrical in Fig. 3 as in Fig. 2, the angular positions of the transmitter and receiver movable element will also tend to be symmetrical. In other words, the receiver pointer 51 will rotate counterclockwise when the transmitter float arms rotate clockwise and vice versa, as explained more in detail in the aforesaid Patent No. 2,197,836.

In order to avoid possible open circuits and deenergization of the receiver 16 resulting from both pairs of brushes 42 and 43 being rotated away from their cooperating resistors temporarily in case of accidental oscillations of the floats 13 and 14, I consider it desirable to provide a slight overlap of approximately 5 degrees, for example, as illustrated in Fig. 3. Instead of having the brushes 25 and 26 exactly parallel, when both floats 13 and 14 are floating free in the tank, I make the mechanical connections such that there is an angle of about 5 degrees between the brush arms causing 5 degrees overlap. Alternatively, the resistors of one of the transmitters 23 or 24 may be rotated 5 degrees to cause the overlap. Consequently, when the transmitters are rotating counterclockwise, the brushes 43 reach the resistors 28 about 5 degrees before the brushes 42 leave the resistors 27. Conversely, when the transmitter arms are rotating clockwise the brushes 42 each contact the resistor 27 before the brushes 43 have left the resistors 28. Except during this angle of overlap, the receiver pointer 51 takes up the same angular position as it would if the transmitter resistors 27 and 28 were in a single circle as shown in Fig. 2. During the angle of overlap there is a slight modification of the angular relationship between the transmitter arms and the receiver pointer, but this modification is taken care of by means of the calibration of the scale 52 of the receiver 16. It will be understood that in any event the receiver scale must be calibrated to conform to the shape of the tank with which the float gauge is employed. The actual angular relationship between the angular locations of the resistors 27 and 28 in the circle may be varied if a corresponding variation is made in the angular locations of brush arms 25 and 26 for the position when the floats 13 and 14 are floating free.

The use of floats in opposite ends of the tank tends to overcome any errors which might otherwise be produced by slight tipping of the tank in one direction or the other, particularly when the tank is about half full. For example, when the liquid level is about as shown in Fig. 1 and the tank is tipped to the right, the float 13 falls but the float 14 rises. Thus resistance is added between the upper brush 42 and the point 36 (Fig. 3) and resistance is subtracted between the upper brush 43 and the conductor 34. The electrical effect of the tipping and the shift of the brush means of one transmitter thus tends to be compensated by the electrical effect of the tipping and the shift of the brush means of the other transmitter.

With resistor segments having the angular dimensions illustrated, the angular deflection of the pointer 51 will substantially equal the combined angular deflection of the float arms 29 and 30. However, the angular deflection of the pointer 51 for a given angular movement of a float arm may be increased by shortening the angular length of the resistors 27 and 28. Care should be taken, nevertheless, to preserve the overlap previously referred to. A modified circuit giving pointer angular deflection of twice that of the two transmitters is illustrated in Figure 4.

In the arrangement of Fig. 4 the transmitters 23 and 24 each comprises two resistors. The transmitter 23 has two resistors 61 and 62 and the transmitter 24 has the resistors 63 and 64. As in the arrangement of Fig. 3 the resistors 61—64 are connected in series to form a closed electrical circuit and the transmission conductors 20 are connected to substantially equally spaced points along the closed resistance circuit. However, in order to double the angular deflection of the receiver pointer for a given angle of deflection of the transmitter arms without changing the angular lengths of the resistors comprising the transmitters 23 and 24, twice as many taps are taken from the resistors comprising the transmitters 23 and 24. For the specific constructions illustrated this means that taps are taken at six substantially equidistant points in Fig. 4 instead of three as in Figs. 2 and 3. For convenience the three transmission conductors 20 are separately identified as 20A, 20B and 20C in Fig. 4. The conductor 20A is connected to a tap 65 on the resistor 61. The conductor 20B is connected to a tap 66 at the end of the resistor 61 which is electrically also the end of resistor 62. The taps 65 and 66 are 120 electrical degrees apart as in the case of the resistor taps in Figs. 2 and 3, but only 60 mechanical degrees apart. The remaining taps 67, 68, 69 and 70 are likewise connected, each 120 electrical degrees from the preceding tap but 60 mechanical degrees from the preceding tap, disregarding the portion of the circuit traversed by connecting conductors between the ends of the resistors. As in the arrangement of Fig. 3, the closed electrical circuit formed by the resistors 61—64 proceeds in the same direction of rotation in both transmitters 23 and 24. For example, if one starts from the tap 66 on the resistor 61 and proceeds clockwise, a circuit is formed through a connecting conductor 71, the resistor 62, a connecting conductor 72, the resistor 64, a connecting conductor 73, the resistor 63, a connecting conductor 74, and through the resistor 61 back to the starting point, tap 66. In the arrangements illustrated the transmitter arms 25 and 26 are intended to rotate in the same direction as the liquid level rises in the tank. However, if the construction were such that the transmitter arms were rotated in opposite directions one of the sets of transmitter resistances would be reversed. For example, the resistors 63 and 64 and the connections therein would each be reversed, end for end.

The conductors 20A, 20B and 20C are connected to every third tap in the resistors 61—64. Thus, the conductors 20A, 20B and 20C are connected to the resistor taps 65, 66 and 67, respectively, and also to the resistor taps 68, 69 and 70, respectively, each conductor thus being connected to two taps which are 360 electrical degrees apart, or 180 mechanical degrees apart. Since the brushes of a given polarity would make contact with three resistor taps if both transmitter arms 25 and 26 were rotated 180 mechanical degrees, thereby causing the magnetic field of the receiver 16 to rotate 360 electrical degrees, the rotation of the receiver pointer is double that of the transmitter arms.

As in the arrangement of Fig. 3 the resistance comprising the transmitters 23 and 24 is divided between the two transmitters. The resistors 61 and 62 of the transmitter 23 may be considered as the equivalent of a complete circle resistor such as the resistor 31 of Fig. 2 cut into two parts 61' and 62', as shown in Fig. 5, and then spread to reduce the curvature to one-half, so that an angular rotation through a given electrical angle corresponds to half that mechanical angle. If the resistor of Fig. 5 is assumed to have been split at one of the points B from which a tap is taken, one end of the resistor 61' is electrically the same point as one end of the resistor 62'. Accordingly, in Fig. 4 the conductor 71 is connected directly between the resistors 61, 62. However, as in Fig. 3 the gap 75 (Fig. 5) formed by cutting the resistors apart is filled in by the resistance of the second transmitter, in this case the transmitter 24 of Fig. 4. In order to identify electrically equivalent points in the transmitters of Figs. 2, 3, 4 and 5, they are marked with the letters A, B and C.

In accordance with the provisions of the patent statutes I have described the principle of operation of my invention, together with the apparatus which I now consider to represent the best embodiment thereof, but I desire to have it understood that the apparatus shown is only illustrative and that the invention may be carried out by other means.

What I claim as new and desire to secure by Letters Patent of the United States, is:

1. In a liquid level gauge for a tilted tank comprising a pair of floats, one in the low and one in the high end of the tank, pivoted supporting arms for said floats, a pair of telemeter transmitters each with relatively rotatable elements, a source of current, a plurality of conductors and a telemeter receiver, of the type with a plurality of terminals equaling the number of conductors, a transmitter system comprising said floats and transmitter elements in combination, each of the transmitter rotatable elements being mechanically connected to one of the float arms, one element of each of the telemeter transmitters comprising an arm carrying a pair of contacts or brushes at the ends thereof adapted to be connected to the current source, the axis of relative rotation of the transmitter elements passing approximately through the center of the arm, the other element of each of the telemeter transmitters comprising two resistors diametrically opposite and lying along arcs of a circle and adapted to cooperate with said brushes, the resistors of one transmitter occupying the angular part of a circle not occupied by the other, the resistors being connected in series to form a full circle equivalent, said resistors having substantially equidistant points around the full circle equivalent of the series-connected transmitter resistors, which points are adapted to be connected to receive terminals, said floats being so connected as to move the brushes along the resistors through the angular range in which the floats float freely with the rising or falling liquid level in the tank and to bring the brushes approximately to the position where one pair of brushes is about to slide off the cooperating resistors and the other has just entered the cooperating resistors when both floats are floating freely and the tank is approximately half full.

2. A transmitter system for a liquid level gauge for a tilted tank having such dimensions and angle to the horizontal that the top wall of the lower end of the tank is substantially no higher than the bottom wall at the other end of the tank so that a single float in any portion of the tank tends to strike one of said tank walls and is ineffective for following the complete range of variations in liquid level in the tank, said gauge being of the type having an energizing current source and a receiver with a plurality of terminals, said transmitter system comprising a plurality of floats arranged along the tank from the low end to the high end, movably supported arms for said floats, and a plurality of telemeter transmitters each with a pair of relatively movable elements, a plurality of conductors and a telemeter receiver, each of the transmitter movable elements being mechanically connected to one of the float arms, one element of each of the telemeter transmitters comprising an arm carrying a pair of contacts or brushes adapted to be connected to the current source, the remaining relatively movable element of each transmitter comprising resistance, all of said transmitter resistance being connected in series to form a closed circuit having spaced taps adapted to be connected to receiver terminals, each transmitter having substantially the same fraction of the total resistance, the brushes in the transmitter being adapted to slide along the resistance for varying the potential distribution in the circuit formed by the total resistance, the movable elements of the transmitters being so connected to the float arms that each float arm causes the corresponding brush to slide along the resistance of a different transmitter, as the float rises and falls between its upper and lower free floating positions, the transmitter resistors being of such length in relation to the ranges of movement of the floats that the float arms carry the transmitter brushes associated therewith beyond the ends of their respective resistors before reaching the limit positions determined by the height of the tank wall, or suitable stops.

3. A telemetering transmitter system for transmitting a continuous indication, or a coordinated series of indications, from a plurality of different transmission points to an indicating instrument at a receiving point having a current source for energization, said system comprising a plurality of transmitter arms movably mounted at different points and adapted to be moved substantially in succession in response to a condition to be indicated at the receiving point, a plurality of resistance segments connected in series to form a closed electrical circuit and distributed among said transmission points, brushes carried by said transmitter arms adapted to be connected to said current source and adapted to slide along said resistance segments in response to movement of the transmitter arms, for varying the voltage distribution in the closed resistance circuit, and spaced taps on the transmitter resistance adapted to be connected to indicating-instrument terminals, the transmitter resistance segments being of such length and so located in relation to the ranges of movement of the transmitter arms that each transmitter arm approaches the end of the resistance segment with which it cooperates substantially as the next transmitter arm begins to travel along the resistance segments with which it cooperates and the brushes are carried off any resistance segment after a transmitter arm has begun to be moved along the next transmitter segment.

4. A telemetering system for transmitting a continuous indication, or a coordinated series of indications, from a plurality of different transmission points to an indicating instrument at a receiving point, said system comprising a plurality of transmitter arms movably mounted at different points and adapted to be moved substantially in succession in response to a condition to be indicated at the receiving point, a plurality of resistance segments connected in series to form a closed electrical circuit and distributed among said transmission points, brushes carried by said transmitter arms and adapted to slide along said resistance segments in response to movement of the transmitter arms for varying the voltage distribution in the closed resistance circuit, said brushes being adapted to be connected to a current source and spaced taps on the transmitter resistance adapted to be connected to indicating-instrument terminals, the transmitter resistance segments being of such length and so located in relation to the ranges of movement of the transmitter arms that each transmitter arm approaches the end of the resistance segments with which it cooperates substantially as the next transmitter arm begins to travel along the resistance segment with which it cooperates and the brushes are carried off any resistance segment after a transmitter arm has begun to be moved along the next transmitter segment, the positions of the resistance segments with respect to the ranges of motion of the transmitter arms being overlapped slightly to insure electrical connection of the current source at all times to the transmitter resistance.

5. Transmitter means for a telemetering system adapted to transmit a continuous indication, or a series of coordinated indications, from different points to a receiver of the "polyphase" type having a plurality of terminals and being responsive to variations in the relative voltages between pairs of terminals, said transmitter means comprising a plurality of transmitter arms movably mounted at different points and adapted to be moved substantially in succession in response to a condition to be indicated at the receiving point, a plurality of resistance segments connected in series to form a closed electrical circuit and distributed among said transmission points, brushes carried by said transmitter arms and adapted to slide along said resistance segments in response to movement of the transmitter arms for varying the voltage distribution in the closed resistance circuit, said brushes being adapted to be connected to a current source, the transmitter resistance having a plurality of spaced taps adapted to be connected to conductors leading to the receiver, the transmitter resistance segments being of such length and so located in relation to the ranges of movement of the transmitter arms that each transmitter arm approaches an end of the resistance segment with which it cooperates substantially as the next transmitter arm begins to travel along the resistance segment with which it cooperates and the brushes are carried off any resistor segment after a transmitter arm has begun to be moved along the next transmitter segment.

6. A system for transmitting coordinated indications from a plurality of different transmitting points to a multiterminal indicating instrument at a receiving point, said system comprising a plurality of resistors located at the transmitting points and connected in series to form a closed electrical circuit, contact brush means located at each of the transmitting points, said brush means being adapted to be connected to a current source, means for sweeping the contact brush means along the resistors successively in response to variations in the coordinated indications to be transmitted, and a plurality of taps spaced along the resistors in the continuous series circuit, said taps being adapted to be connected to indicating-instrument terminals.

7. In a liquid level gauge for a tank comprising a pair of floats in opposite ends of the tank, movably supported arms for said floats, a pair of telemeter transmitters each with a pair of relatively movable elements, a source of current, and a telemeter receiver, an indication-transmitting system comprising said pair of transmitters, each of the transmitter movable elements being adapted to be mechanically connected to one of the float arms, one element of each of the telemeter transmitters comprising an arm carrying brush means adapted to be connected to the current source, the remaining relatively movable element of each transmitter comprising resistance, all of said transmitter resistance being connected to form a circuit, each transmitter having a fraction of the total resistance, the brush means being adapted to slide along the resistance for varying the potential distribution in the circuit formed by the resistance, the movable elements of the transmitters being adapted to be so connected to the float arms that each float arm causes a corresponding brush to slide along the resistance of one of the transmitters as the float rises and falls according to rise and fall of the liquid level in the tank, and spaced taps on the transmitter resistance adapted to be connected to receiver terminals.

JOHN R. MACINTYRE.